United States Patent
Bi et al.

(10) Patent No.: US 11,934,543 B1
(45) Date of Patent: Mar. 19, 2024

(54) TRANSIENT OBJECT REFERENCES

(71) Applicant: Snowflake Inc., Bozeman, MT (US)

(72) Inventors: Jennifer Wenjun Bi, Palo Alto, CA (US); Khalid Zaman Bijon, Santa Cruz, CA (US); Damien Carru, New York, NY (US); Thierry Cruanes, San Mateo, CA (US); Simon Holm Jensen, Menlo Park, CA (US); Daniel N. Meredith, Laguna Beach, CA (US); Subramanian Muralidhar, Mercer Island, WA (US); Eric Robinson, Sammamish, WA (US); David Schultz, Piedmont, CA (US); Zixi Zhang, San Mateo, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/056,489

(22) Filed: Nov. 17, 2022

(51) Int. Cl.
*G06F 21/60* (2013.01)
*G06F 21/62* (2013.01)

(52) U.S. Cl.
CPC ........ *G06F 21/604* (2013.01); *G06F 21/6227* (2013.01); *G06F 2221/2113* (2013.01); *G06F 2221/2141* (2013.01)

(58) Field of Classification Search
CPC ............... G06F 21/604; G06F 21/6218; G06F 21/6227; G06F 2221/2113; G06F 2221/2141
See application file for complete search history.

(56) References Cited

U.S. PATENT DOCUMENTS

| | | | |
|---|---|---|---|
| 5,572,673 A | 11/1996 | Shurts | |
| 5,778,350 A | 7/1998 | Adams et al. | |
| 5,798,506 A | 8/1998 | Thiriet | |
| 6,038,563 A | 3/2000 | Bapat et al. | |
| 6,954,797 B1 * | 10/2005 | Takeda | H04L 9/40 709/236 |
| 7,010,580 B1 | 3/2006 | Fu et al. | |

(Continued)

FOREIGN PATENT DOCUMENTS

| | | |
|---|---|---|
| CN | 104781809 | 7/2015 |
| CN | 104866513 | 8/2015 |

(Continued)

OTHER PUBLICATIONS

"U.S. Appl. No. 16/745,922, Non-Final Office Action dated Mar. 23, 2020", 25 pgs.

(Continued)

*Primary Examiner* — Kevin Bechtel
(74) *Attorney, Agent, or Firm* — Schwegman Lundberg & Woessner, P.A.

(57) ABSTRACT

Systems and methods for generating transient object references are provided. The systems and methods perform operations including establishing a session between a first entity and a second entity. The operations include identifying an object that the first entity is authorized to access according to a first set of access privileges. The operations include generating a reference associated with the object. The operations include temporarily authorizing the second entity to access the object using the reference according to a second set of access privileges, the second set of access privileges being derived from the first set of access privileges.

25 Claims, 8 Drawing Sheets

(56) References Cited

U.S. PATENT DOCUMENTS

| | | | |
|---|---|---|---|
| 7,051,039 | B1 | 5/2006 | Murthy et al. |
| 7,467,414 | B2 | 12/2008 | Schlesinger |
| 7,506,357 | B1 | 3/2009 | Moriconi et al. |
| 7,797,276 | B1 | 9/2010 | Yang |
| 7,865,959 | B1 | 1/2011 | Lewis |
| 9,256,659 | B1 | 2/2016 | Willett et al. |
| 9,754,119 | B1 | 9/2017 | Kilday |
| 10,277,601 | B1 | 4/2019 | Higgins et al. |
| 10,430,605 | B1 | 10/2019 | Nerurkar et al. |
| 11,341,828 | B2 | 5/2022 | Shakedd et al. |
| 11,372,995 | B2 | 6/2022 | Avanes et al. |
| 11,463,499 | B1* | 10/2022 | Fieldman .............. H04L 65/403 |
| 11,544,399 | B2 | 1/2023 | Avanes et al. |
| 2006/0137019 | A1 | 6/2006 | Dettinger et al. |
| 2006/0285535 | A1 | 12/2006 | Metcalf et al. |
| 2008/0010233 | A1* | 1/2008 | Sack .................. G06F 21/6227 |
| 2008/0282354 | A1 | 11/2008 | Wobber et al. |
| 2011/0242974 | A1 | 10/2011 | Das et al. |
| 2012/0246115 | A1 | 9/2012 | King et al. |
| 2012/0330925 | A1 | 12/2012 | Ramamurthy et al. |
| 2013/0067594 | A1* | 3/2013 | Kantor ................ H04L 63/0838 726/28 |
| 2013/0262424 | A1 | 10/2013 | Cain, III et al. |
| 2014/0101644 | A1 | 4/2014 | Buzaski et al. |
| 2015/0200945 | A1 | 7/2015 | Edson |
| 2016/0012465 | A1 | 1/2016 | Sharp |
| 2016/0188617 | A1 | 6/2016 | Gaikwad |
| 2017/0200122 | A1 | 7/2017 | Edson et al. |
| 2017/0324740 | A1 | 11/2017 | Mao et al. |
| 2017/0331826 | A1 | 11/2017 | Rodniansky |
| 2018/0060603 | A1 | 3/2018 | Ahmed et al. |
| 2018/0121110 | A1 | 5/2018 | Sawhney |
| 2018/0196955 | A1 | 7/2018 | Dageville et al. |
| 2018/0285559 | A1* | 10/2018 | Branco ................ G06F 21/552 |
| 2018/0357444 | A1 | 12/2018 | Kammath et al. |
| 2019/0188408 | A1* | 6/2019 | Glik .................... G06F 21/6218 |
| 2021/0224409 | A1 | 7/2021 | Avanes et al. |
| 2022/0229925 | A1 | 7/2022 | Avanes et al. |
| 2023/0089449 | A1 | 3/2023 | Avanes et al. |

FOREIGN PATENT DOCUMENTS

| | | |
|---|---|---|
| CN | 108475271 | 8/2018 |
| CN | 110192189 | 8/2019 |
| CN | 113508383 A | 10/2021 |
| WO | 2021146057 A1 | 7/2021 |

OTHER PUBLICATIONS

"International Application Serial No. PCT/US2020/070339, International Search Report dated Aug. 26, 2020", 2 pgs.

"International Application Serial No. PCT/US2020/070339, Written Opinion dated Aug. 26, 2020", 5 pgs.

"U.S. Appl. No. 16/745,922, Notice of Allowance dated Mar. 18, 2022", 18 pgs.

"U.S. Appl. No. 16/745,922, Response filed Jun. 23, 2020 to Non-Final Office Action dated Mar. 23, 2020", 23 pgs.

"U.S. Appl. No. 17/657,578, Non-Final Office Action dated Jun. 2, 2022", 15 pgs.

"International Application Serial No. PCT/US2020/070339, International Preliminary Report on Patentability dated Jul. 28, 2022", 7 pgs.

"U.S. Appl. No. 17/657,578, Response filed Sep. 2, 2022 to Non-Final Office Action dated Jun. 2, 2022", 12 pgs.

"U.S. Appl. No. 17/657,578, Notice of Allowance dated Sep. 22, 2022", 8 pgs.

"European Application Serial No. 20914306.4, Response filed Feb. 17, 2023 to Communication pursuant to Rules 161 and 162 dated Aug. 24, 2022", 13 pgs.

"U.S. Appl. No. 18/057,878, Non-Final Office Action dated Mar. 28, 2023", 19 pgs.

"U.S. Appl. No. 18/057,878, Response filed May 23, 2023 to Non-Final Office Action dated Mar. 28, 2023", 14 pgs.

"U.S. Appl. No. 18/057,878, Notice of Allowance dated Aug. 30, 2023", 11 pgs.

"Chinese Application Serial No. 202080007708.3, Office Action dated Aug. 3, 2023", with machine English translation, 14 pages.

"U.S. Appl. No. 18/057,878, Corrected Notice of Allowability dated Oct. 25, 2023", 2 pgs.

"Chinese Application Serial No. 202080007708.3, Response filed Oct. 24, 2023 to Office Action dated Aug. 3, 2023", with English claims, 17 pages.

* cited by examiner

TRANSIENT OBJECT REFERENCES

TECHNICAL FIELD

Embodiments of the disclosure relate generally to data platforms and databases and, more specifically, to managing access privileges for database objects.

BACKGROUND

Databases are widely used for data storage and access in computing applications. A goal of database storage is to provide enormous sums of information in an organized manner so that it can be accessed, managed, updated, and shared. In a database, data may be organized into rows, columns, and tables. Databases are used by various entities and companies for storing information that may need to be accessed or analyzed. Various operations performed on a database, such as joins and unions, involve combining query results obtained from different data sources (e.g., different tables, possibly on different databases) into a single query result. The various operations that can be performed on the databases are controlled based on access privileges of requesting entities.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
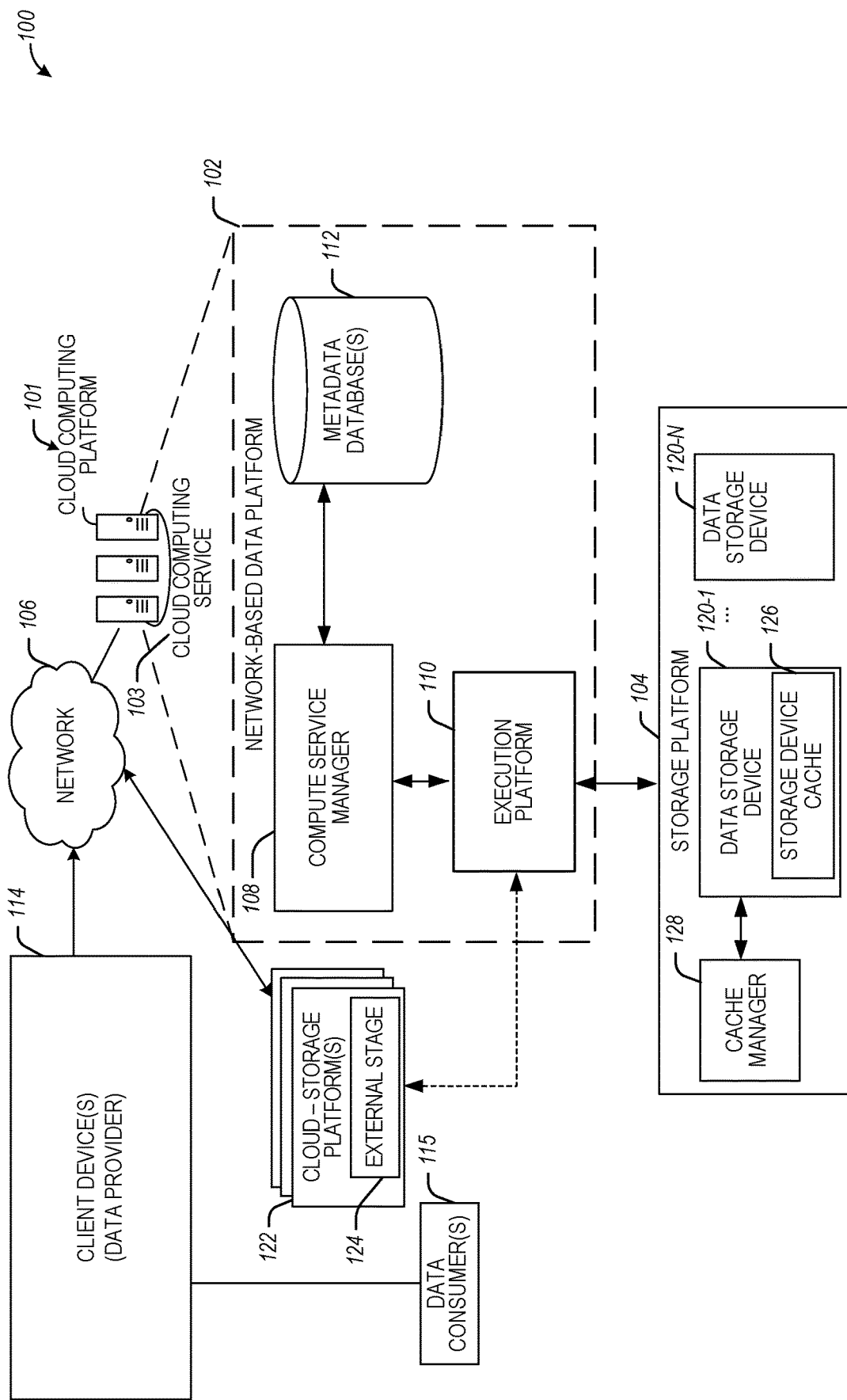
FIG. 1 illustrates an example computing environment that includes a network-based data platform, in accordance with some embodiments of the present disclosure.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Data platforms are widely used for data storage and data access in computing and communication contexts. Concerning architecture, a data platform could be an on-premises data platform, a network-based data platform (e.g., a cloud-based data platform), a combination of the two, and/or include another type of architecture. With respect to type of data processing, a data platform could implement online transactional processing (OLTP), online analytical processing (OLAP), a combination of the two, and/or another type of data processing. Moreover, a data platform could be or include a relational database management system (RDBMS) and/or one or more other types of database management systems.

In a typical implementation, a data platform includes one or more databases that are maintained on behalf of a customer account. The data platform may include one or more databases that are respectively maintained in association with any number of customer accounts, as well as one or more databases associated with a system account (e.g., an administrative account) of the data platform, one or more other databases used for administrative purposes, and/or one or more other databases that are maintained in association with one or more other organizations and/or for any other purposes. A data platform may also store metadata in association with the data platform in general and in association with, as examples, particular databases and/or particular customer accounts as well. The database can include one or more objects, such as tables, functions, and so forth.

Users and/or executing processes that are associated with a given customer account may, via one or more types of clients, be able to cause data to be ingested into the database, and may also be able to manipulate the data, add additional data, remove data, run queries against the data, generate views of the data, and so forth.

In an example implementation of a data platform, a given database is represented as an account-level object within a customer account, and the customer account may also include one or more other account-level objects such as users, roles, and/or the like. Furthermore, a given account-level database object may itself contain one or more objects such as tables, schemas, views, streams, tasks, and/or the like.

A given table may be organized as records (e.g., rows or a collection of rows) that each include one or more attributes (e.g., columns). A data platform may physically store database data in multiple storage units, which may be referred to as blocks, micro-partitions, and/or by one or more other names. In an example, a column of a database can be stored in a block and multiple blocks can be grouped into a single file. That is, a database can be organized into a set of files where each file includes a set of blocks. Consistent with this example, for a given column, all blocks are stored contiguously and blocks for different columns are row aligned. Data stored in each block can be compressed to reduce its size. A block storing compressed data may also be referred to as a "compression block" herein. As referred to herein, a "record" is defined as a collection of data (e.g., textual data) in a file that is organized by one or more fields, where each field can include one or more respective data portions (e.g., textual data, such as strings). Each field in the record can correspond to a row or column of data in a table that represents the records in the file. It should be understood that the terms "row" and "column" are used for illustration purposes and these terms are interchangeable. Data arranged in a column of a table can similarly be arranged in a row of the table.

In certain systems, a set of objects of a database are usually owned by a particular entity or process (e.g., a first entity) in which the entity or process has full access privileges for the set of objects. For example, the first entity can modify or delete portions of the set of objects. The first entity can share access to the set of objects with a second entity or process to allow the second entity or process to perform a certain set of functions with respect to the set of objects. One way in which the set of objects can be shared is by actually sending those objects to the second entity. However, sharing of the objects in this way can consume a great deal of extra storage resources and processing resources and can also violate certain security and privacy measures. Another way to share access to the set of objects is by manually specifying an identity of the second entity to which access needs to be shared and indicating the level of access privilege to provide to the second entity. While such approaches generally work, there is a need to revoke access from the second entity after the operations complete being performed by the second entity. This is to ensure that data privacy and security remains intact.

The process to remove the privileges (permissions) is usually manual, tedious, and time consuming. Also, remembering to revoke such permissions carries a large processing burden which consumes a great deal of resources. In addition, the process of manually managing privileges (permissions) for database objects is time consuming, inefficient, and prone to human error, which can result in waste of time, network, and processing device resources.

Aspects of the present disclosure include systems, methods, and devices to address, among other problems, the aforementioned shortcomings of conventional data platforms by intelligently sharing access privileges (permissions) for various database objects and automatically managing such privileges (permissions) in a computationally efficient manner and in a way that maintains data privacy and security. Specifically, a unique textual reference (e.g., a reference that does not contain a link) is created by the first entity that is then associated with a particular object for which the first entity has access privileges. The unique textual reference is provided to a second entity to share at least a subset of the access privileges of the first entity with the second entity. The second entity can perform one or more operations on the object by calling a function using the unique textual reference as a field or argument of the function. After a specified criterion, such as an end of a session between the first and second entities and/or after the function returns a result, the unique textual reference is deleted or disassociated from the object to prevent future access to the object using the same unique textual reference.

In such ways, because the unique textual reference is a random sequence of characters (e.g., a string) and is associated with a session of the first and second entities, other entities cannot use the same unique textual reference to gain access to the same object. Also, because the unique textual reference does not include a link, the storage location and security associated with the object remains hidden from the second entity, which preserves the secure nature of the object while allowing the second entity to access and operate on the object. This allows the disclosed techniques to temporarily authorize a second entity to access data objects associated with a first entity while preserving privacy and security of the data objects.

In some examples, the disclosed techniques perform operations for establishing a session between a first entity and a second entity. The operations include identifying an object that the first entity is authorized to access according to a first set of access privileges. The operations include generating a reference associated with the object. The operations include temporarily authorizing the second entity to access the object using the reference according to a second set of access privileges, the second set of access privileges being derived from the first set of access privileges.

By performing operations for sharing access privileges and managing such access privileges in this manner, the data platform increases utilization of execution node processing capability and avoids waste of resources and inefficient use of resources. Specifically, rather than having a human manually create and manage access permissions or privileges, which wastes a great deal of time and effort, the disclosed system can automate this process to improve the overall efficiency of the system, which improves the overall functioning of the device.

FIG. 1 illustrates an example computing environment 100 that includes a data platform in the example form of a network-based data platform 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform. For example, in some aspects, the computing environment 100 may include a cloud computing platform 101 with the network-based data platform 102 and a storage platform 104 (also referred to as a cloud storage platform). The cloud computing platform 101 provides computing resources and storage resources that may be acquired (purchased) or leased and configured to execute applications and store data.

The cloud computing platform 101 may host a cloud computing service 103 that facilitates storage of data on the cloud computing platform 101 (e.g., data management and access) and analysis functions (e.g., structured query language (SQL) queries, analysis, as well as other processing capabilities (e.g., parallel execution of sub-plans, as described herein). The cloud computing platform 101 may include a three-tier architecture: data storage (e.g., storage platforms 104 and 122), an execution platform 110 (e.g., providing query processing), and a compute service manager 108 providing cloud services.

It is often the case that organizations that are customers of a given data platform also maintain data storage (e.g., a data lake) that is external to the data platform (e.g., one or more external storage locations). For example, a company could be a customer of a particular data platform and also separately maintain storage of any number of files—be they unstructured files, semi-structured files, structured files, and/or files of one or more other types—on, as examples, one or more of their servers and/or on one or more cloud-storage platforms such as AMAZON WEB SERVICES™ (AWS™), MICROSOFT® AZURE®, GOOGLE CLOUD PLATFORM™, and/or the like. The customer's servers and cloud-storage platforms are both examples of what a given customer could use as what is referred to herein as an external storage location. The cloud computing platform 101 could also use a cloud-storage platform as what is referred to herein as an internal storage location concerning the data platform. The techniques described in this disclosure pertain to non-volatile storage devices that are used for the internal storage location and/or the external storage location.

From the perspective of the network-based data platform 102 of the cloud computing platform 101, one or more files that are stored at one or more storage locations are referred to herein as being organized into one or more of what is referred to herein as either "internal stages" or "external stages." Internal stages are stages that correspond to data storage at one or more internal storage locations, and external stages are stages that correspond to data storage at one or more external storage locations. In this regard, external files can be stored in external stages at one or more external storage locations, and internal files can be stored in internal stages at one or more internal storage locations, which can include servers managed and controlled by the same organization (e.g., company) that manages and controls the data platform, and which can instead or in addition include data-storage resources operated by a storage provider (e.g., a cloud-storage platform) that is used by the data platform for its "internal" storage. The internal storage of a data platform is also referred to herein as the "storage platform" of the data platform. It is further noted that a given external file that a given customer stores at a given external storage location may or may not be stored in an external stage in the external storage location. For example, in some data-platform implementations, it is a customer's choice whether to create one or more external stages (e.g., one or more external-stage objects) in the customer's data-platform account as an organizational and functional construct for conveniently interacting via the data platform with one or more external files.

As shown, the network-based data platform 102 of the cloud computing platform 101 is in communication with the cloud storage platforms 104 and 122 (e.g., Amazon Web Services (AWS)®, Microsoft Azure Blob Storage®, or Google Cloud Storage). The network-based data platform 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based data platform 102.

The network-based data platform 102 comprises a compute service manager 108, an execution platform 110, and one or more metadata databases 112. The network-based data platform 102 hosts and provides data reporting and analysis services to multiple client accounts.

The compute service manager 108 coordinates and manages operations of the network-based data platform 102. The compute service manager 108 also performs query optimization and compilation as well as managing clusters of computing services that provide compute resources (also referred to as "virtual warehouses"). The compute service manager 108 can support any number of client accounts such as end-users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based data platform 102. A user may utilize the client device 114 to submit data storage, retrieval, and analysis requests to the compute service manager 108. Client device 114 (also referred to as user device 114) may include one or more of a laptop computer, a desktop computer, a mobile phone (e.g., a smartphone), a tablet computer, a cloud-hosted computer, cloud-hosted serverless processes, or other computing processes or devices that may be used to access services provided by the cloud computing platform 101 (e.g., cloud computing service 103) by way of a network 106, such as the Internet or a private network.

In the description below, actions are ascribed to users, particularly consumers and providers. Such actions shall be understood to be performed concerning client device (or devices) 114 operated by such users. For example, notification to a user may be understood to be a notification transmitted to client device 114, input or instruction from a user may be understood to be received by way of the client device 114, and interaction with an interface by a user shall be understood to be interaction with the interface on the client device 114 by a data consumer 115. In addition, database operations (joining, aggregating, analysis, etc.) ascribed to a user (consumer or provider) shall be understood to include performing such actions by the cloud computing service 103 in response to an instruction from that user.

Some database operations performed by the compute service manager 108 can include an operation to share and manage access privileges to one or more database objects. For example, the database object can be associated with a first set of access privileges for a first entity to perform. The first set of access privileges define what actions or operations the first entity can perform. A second entity may have no access privileges and may not even know the storage location or existence of the database object. In such cases, the first entity can share at least a portion or subset of the first set of access privileges with the second entity in a temporary manner. To do so, the first entity can establish a session with the second entity and can generate a reference to the database object. The reference can be stored in a table that associates the session with the database object and the reference along with a second set of access privileges that are derived from the first set of access privileges. The second entity can then call a function using the reference as a field, argument, or parameter.

Once called, the first entity can use the table to identify the object based on the session and the reference and to obtain the second set of access privileges of the second entity. The first entity can perform the operation associated with the function and return a result to the second entity. In some cases, once the session is closed or upon returning the result to the second entity, the second set of access privileges are automatically removed and/or the reference is automatically deleted from the table. This prevents the second entity or any other entity from using the same reference to access the same database object at a future time in an unauthorized manner.

The compute service manager 108 is also coupled to one or more metadata databases 112 that store metadata about various functions and aspects associated with the network-based data platform 102 and its users. The metadata database 112 can store the table that provides the mapping between sessions, references to objects, identity of objects, and/or access privileges of the objects. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device. In some embodiments, metadata database 112 is configured to store account object metadata.

Figure 3:
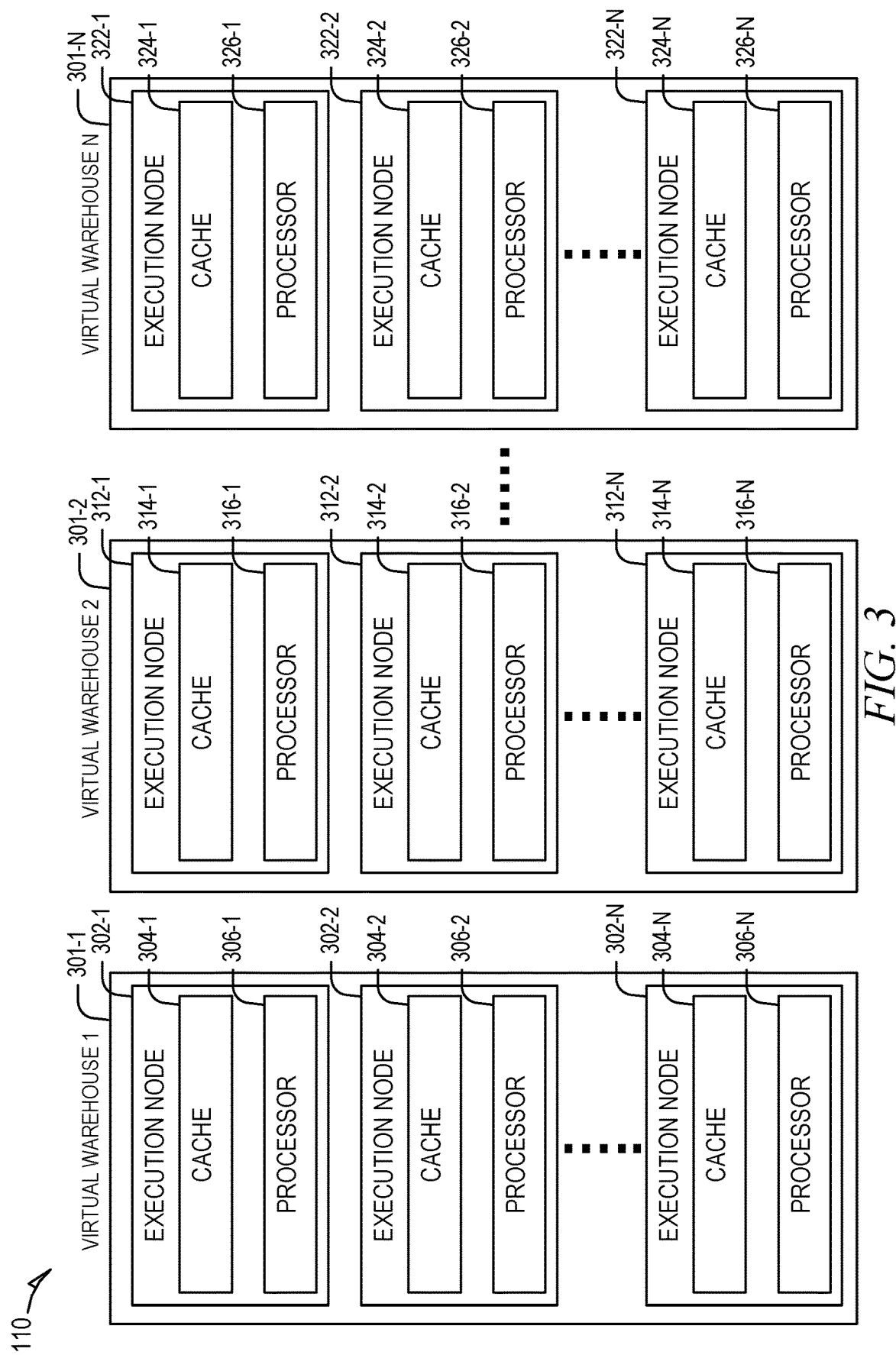
FIG. 3 is a block diagram illustrating components of an execution platform, in accordance with some embodiments of the present disclosure.

The compute service manager 108 is further coupled to the execution platform 110, which provides multiple computing resources that execute various data storage and data retrieval tasks. As illustrated in FIG. 3, the execution platform 110 comprises a plurality of compute nodes. The execution platform 110 is coupled to storage platform 104 and cloud storage platforms 122. The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid-state drives (SSDs), storage clusters, Amazon S3 ™ storage systems, or any other data-storage technology. Additionally, the cloud storage platform 104 may include distributed file systems (such as Hadoop Distributed File Systems (HDFS)), object storage systems, and the like.

In some embodiments, at least one storage device cache 126 (e.g., an internal cache) may reside on one or more of the data storage devices 120-1 to 120-N, and at least one external stage 124 may reside on one or more of the cloud storage platforms 122. In some examples, a single storage device cache 126 can be associated with all of the data storage devices 120-1 to 120-N so that the single storage device cache 126 is shared by and can store data associated with any one of the data storage devices 120-1 to 120-N. In some examples, each data storage device data of storage devices 120-1 to 120-N can include or implement a separate storage device cache 126. A cache manager 128 handles the transfer of data from the data storage devices 120-1 to 120-N to the storage device cache 126. The cache manager 128 handles the eviction of data from the storage device cache 126 to the respective associated data storage devices 120-1 to 120-N. The storage platform 104 can include one or more hard drives and/or can represent a plurality of hard drives distributed on a plurality of servers in a cloud computing environment.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

The compute service manager 108, metadata database(s) 112, execution platform 110, and storage platform 104 are shown in FIG. 1 as individual discrete components. However, each of the compute service manager 108, metadata database(s) 112, execution platform 110, and storage platform 104 may be implemented as a distributed system (e.g., distributed across multiple systems/platforms at multiple geographic locations). Additionally, each of the compute service manager 108, metadata database(s) 112, execution platform 110, and storage platform 104 can be scaled up or down (independently of one another) depending on changes to the requests received and the changing needs of the network-based data platform 102. Thus, in the described embodiments, the network-based data platform 102 is dynamic and supports regular changes to meet the current data processing needs.

During a typical operation, the network-based data platform 102 processes multiple jobs (e.g., operators of sub-plans) determined by the compute service manager 108. These jobs (e.g., caller processes) are scheduled and managed by the compute service manager 108 to determine when and how to execute the job. For example, the compute service manager 108 may divide the job into multiple discrete tasks (e.g., caller processes) and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task (e.g., in a storage device cache 126, such as an HDD cache or random access memory (RAM)) and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

According to various embodiments, the execution platform 110 executes a query according to a query plan determined by the compute service manager 108. As part of executing the query, the execution platform performs a table scan in which one or more portions of a database table are scanned to identify data that matches the query. More specifically, the database table can be organized into a set of files where each file comprises a set of blocks (or records) and each block (or record) stores at least a portion of a column (or row) of the database. Each execution node provides multiple threads of execution, and in performing a table scan, multiple threads perform a parallel scan of the set of blocks (or records) of a file, which may be selected from a scan set corresponding to a subset of the set of files into which the database is organized.

The cloud computing platform 101 of the computing environment 100 separates the execution platform 110 from the storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2:
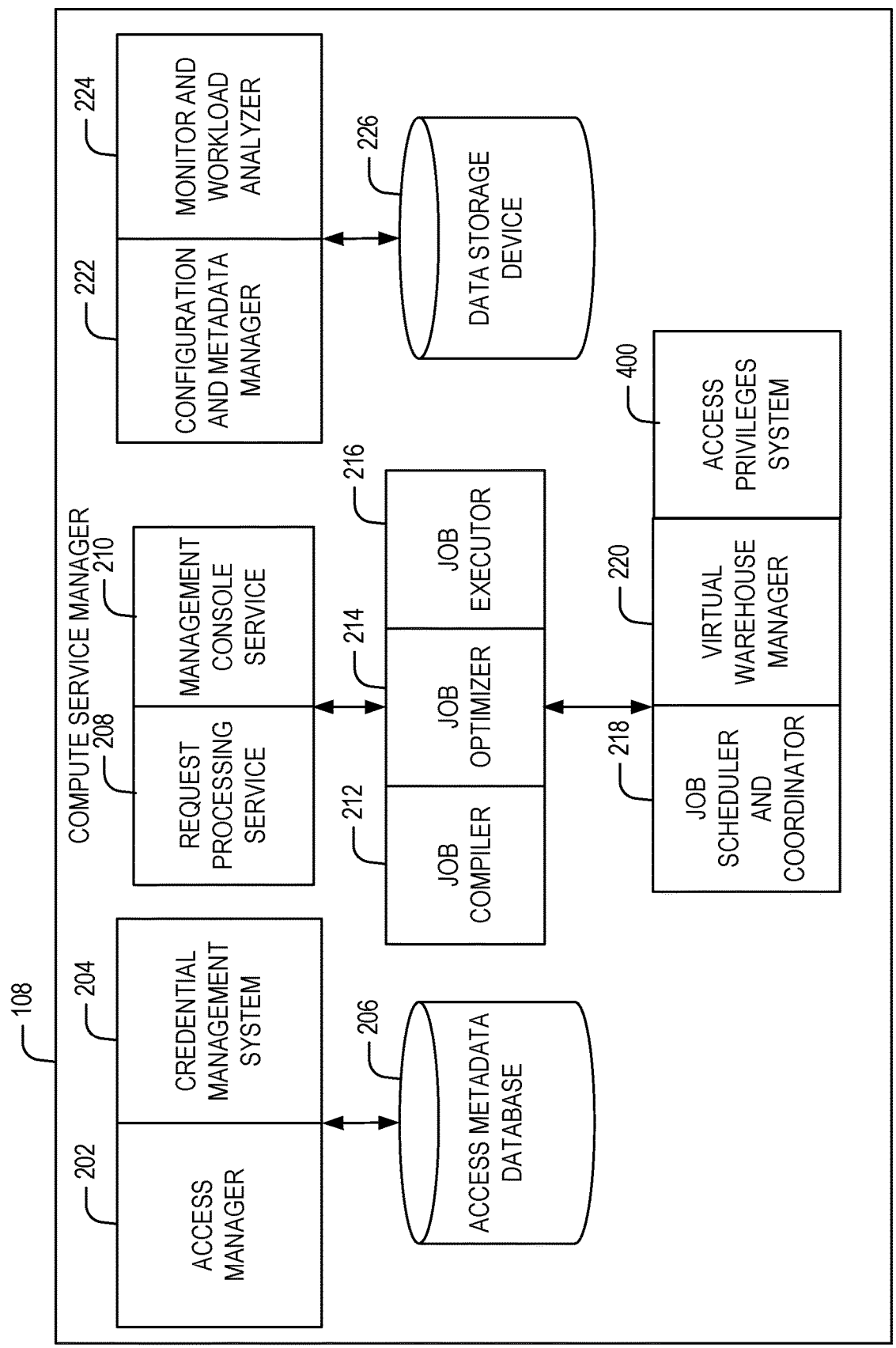
FIG. 2 is a block diagram illustrating components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a credential management system 204 coupled to an access metadata database 206, which is an example of the metadata database(s) 112. Access manager 202 handles authentication and authorization tasks for the systems described herein. The credential management system 204 facilitates the use of remotely stored credentials to access external resources such as data resources in a remote storage device. As used herein, the remote storage devices may also be referred to as "persistent storage devices," "non-volatile storage devices," "cloud storage devices," or "shared storage devices." For example, the credential management system 204 may create and maintain remote credential store definitions and credential objects (e.g., in the access metadata database 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

In some cases, the first set of access privileges that are associated with the first entity can include one or more credentials of the first entity that are stored by the credential management system 204. The first entity can share such one or more credentials with the second entity in a temporary manner and without revealing the contents of the credentials of the first entity. Particularly, the reference that includes a random sequence of characters (string) is internally associated with the credentials of the first entity. This reference is provided to the second entity, which keeps hidden the credentials of the first entity. The second entity can call a function using the reference. In response to calling the function, the credential management system 204 can locate the credentials of the first entity using the reference and allow the second entity to perform one or more operations associated with the function using the credentials of the first entity. Once the function is complete and returns a result, the reference is removed or deleted automatically to prevent future or further use of the credentials using the same reference.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110, in a storage device cache 126, or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. Job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries by one or more execution nodes of the execution platform 110. In some cases, the compute service manager includes an access privileges system 400, discussed in more detail below, to handle jobs of the job executor 216.

Additionally, the compute service manager 108 includes a configuration and metadata manager 222, which manages the information related to the data stored in the remote data storage devices and the local buffers (e.g., the buffers in execution platform 110). The configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based data platform 102 and may further redistribute tasks based on a user (e.g., "external") query workload that may also be processed by the execution platform 110. The configuration and metadata manager 222 and the monitor and workload analyzer 224 are coupled to a data storage device 226. The data storage device 226 in FIG. 2 represents any data storage device within the network-based data platform 102. For example, data storage device 226 may represent buffers in execution platform 110, storage devices in storage platform 104, or any other storage device.

FIG. 3 is a block diagram illustrating components of the execution platform 110, which can be implemented by any of the virtual warehouses of the execution platform 110, in accordance with some embodiments of the present disclosure. As shown in FIG. 3, the execution platform 110 includes multiple virtual warehouses, including virtual warehouse 1 (or 301-1), virtual warehouse 2 (or 301-2), and virtual warehouse N (or 301-N). Each virtual warehouse includes multiple execution nodes that each include a data cache and a processor. The virtual warehouses can execute multiple tasks in parallel by using multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in the cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing data from any of the data storage devices 120-1 to 120-N and their associated storage device cache 126 (e.g., via a respective lock file) shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternative embodiments may include execution nodes containing any number of processors and any number of caches. Additionally, the caches may vary in size among the different execution nodes. The caches shown in FIG. 3 store, in the local execution node, data that was retrieved from one or more data storage devices in the cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104. The techniques described with respect to the cache manager 128 of the storage platform 104 (e.g., a HDD) can be similarly applied to the cache 304-N, 314-N, and 324-N of the execution nodes 302-N, 312-N, and 322-N.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and N are associated with the same execution platform 110, virtual warehouses 1, N may be implemented using multiple computing systems at multiple geographic locations. For example, virtual warehouse 1 can be implemented by a computing system at a first geographic location, while virtual warehouses 2 and N are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location, and execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault-tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in the cloud storage platform 104, but each virtual warehouse has its execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
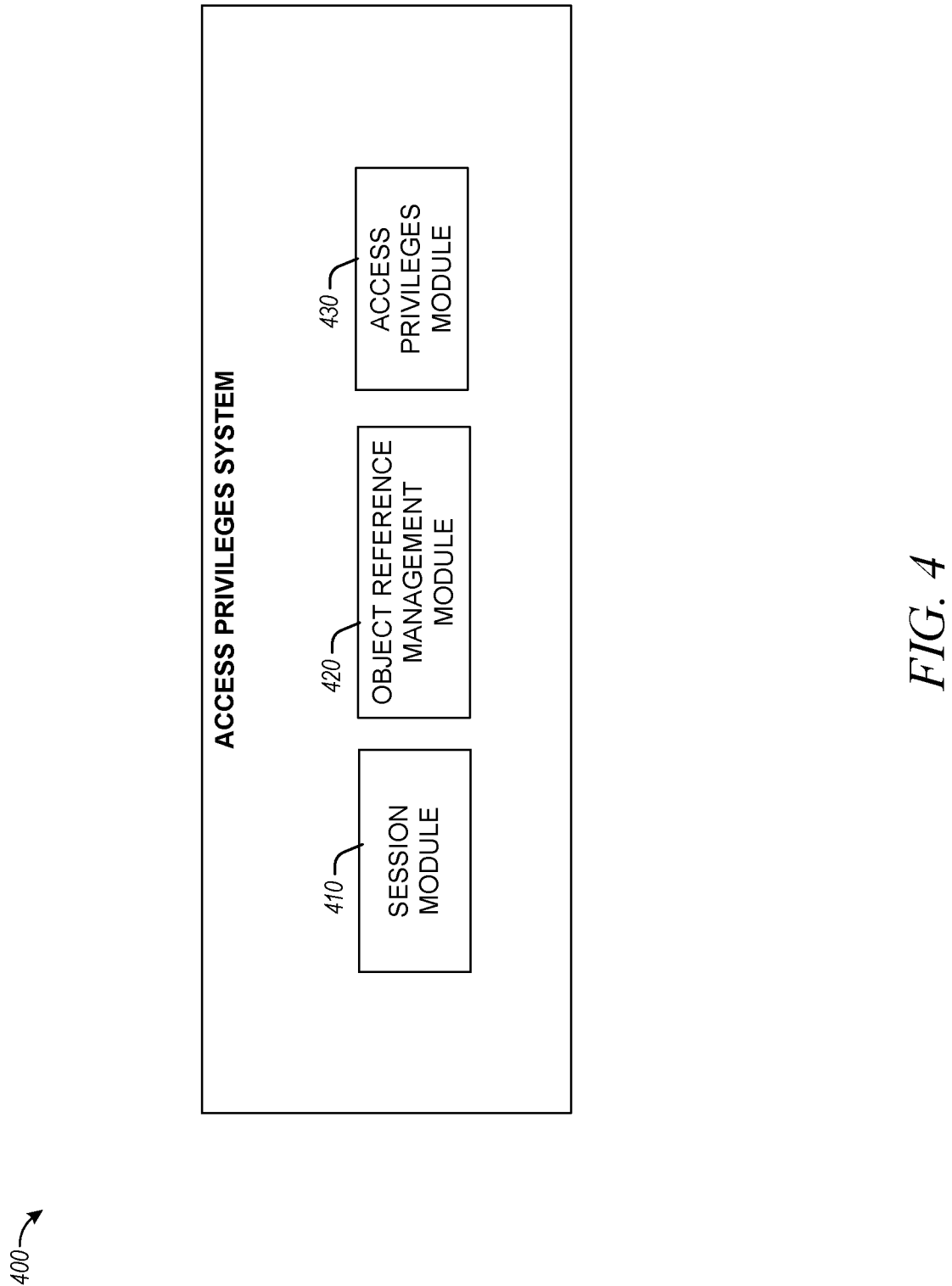
FIG. 4 is a block diagram of an access privileges system, in accordance with some embodiments of the present disclosure.

FIG. 4 is a block diagram illustrating an example of the access privileges system 400, which can be implemented by any of the virtual warehouses of the execution platform 110, such as the access manager 202 or credential management system 204, in accordance with some embodiments of the present disclosure. The access privileges system 400 can include a session module 410, an object reference management module 420, and an access privileges module 430. The access privileges system 400 is configured to establish a session between first and second entities (e.g., processes). The access privileges system 400 allows the first entity to share access to one or more database objects to which the first entity has access currently with the second entity on a temporary or transient basis. Specifically, the first entity can provide a set of access privileges to the second entity to allow the second entity to temporarily perform one or more database operations on the one or more database objects without revealing the storage location, security settings, or privacy information associated with the one or more database objects. Once the operations are completed and/or once the session is closed or terminated, the set of access privileges provided to the second entity is automatically revoked.

In some examples, the access privileges system 400 establishes a session between a first entity and a second entity. The access privileges system 400 identifies an object that the first entity is authorized to access according to a first set of access privileges and generates a reference associated with the object. The access privileges system 400 temporarily authorizes the second entity to access the object using the reference according to a second set of access privileges, the second set of access privileges being derived from the first set of access privileges. In some aspects, the session includes a SQL session. The object includes a table or function.

In some examples, the first entity includes a producer or caller process and the second entity includes a consumer process. In some aspects, the second set of access privileges is identical to the first set of access privileges. In some aspects, the second set of access privileges is a subset of the first set of access privileges and includes at least one or more fewer access privileges than the first set of access privileges.

In some aspects, the first set of access privileges include search, read, select, insert, update, and truncate privileges and the second set of access privileges include only a read or select privilege.

In some examples, the reference includes a unique sequence of characters and excludes a direct link to the object. In some examples, the access privileges system 400 generates the reference by storing, in association with the session, a table that maps the unique sequence of characters of the reference to the object and the second set of access privileges. In some aspects, the access privileges system 400 temporarily authorizes the second entity to access the object using the reference by deleting the table after the session is terminated.

In some examples, the access privileges system 400 performs, by the second entity, a first function call that receives the reference as an argument. The access privileges system 400 passes the reference via the first function call to the first entity. The access privileges system 400 searches the table using the reference to identify the object and the second set of access privileges. In some aspects, the access privileges system 400 determines an operation associated with the first function. The access privileges system 400 determines that the operation corresponds to the second set of access privileges. The access privileges system 400 performs the operation on the object in response to determining that the operation corresponds to the second set of access privileges. The access privileges system 400 provides a result of the operation as an output of the function to the second entity.

In some examples, the access privileges system 400 temporarily authorizes the second entity to access the object using the reference by deleting the reference from the table in response to providing the result of the operation as the output of the function to the second entity. In some examples, the access privileges system 400 temporarily authorizes the second entity to access the object using the reference by accessing a stack of functions including the first function and a second function in response to providing the result of the operation as the output of the function to the second entity. The access privileges system 400 removes the first function from the stack in response to providing the result of the operation as the output of the function to the second entity. The access privileges system 400 determines that the second function is at a top of the stack and retains the reference in the table in response to determining that the second function is at the top of the stack. In some aspects, the access privileges system 400 deletes the reference from the table in response to determining that the stack of functions is empty.

In some examples, the access privileges system 400 detects a change to the first set of access privileges and updates the second set of access privileges in response to detecting the change to the first set of access privileges. In some examples, the access privileges system 400 prevents the second entity from accessing the object using the reference after the session is terminated or after one or more function calls performed by the second entity return respective one or more results.

The session module 410 is configured to allow a first entity to establish a secure or unsecure communication session with a second entity. The first entity can be a first process running on one or more processing devices that are the same or different as a second process corresponding to the second entity. The first and second entities can be associated with a same company or user or different companies or users. In some examples, the first entity is associated with first access credentials used to log into the computing environment 100 and the second entity is associated with second access credentials used to log into the computing environment 100. The second entity may generate one or more SQL statements using an application programming interface (API) of the first entity to communicate information with the first entity and to access information associated with a database of the first entity. Once a session is established between the first and second entities, such as based on the first and second entities requesting to communicate with each other using the computing environment 100, a session identifier (session ID) is stored by the session module 410 that identifies the first and second entities.

One or more data structures that represent APIs of each of the first and second entities can be stored in the computing environment 100 in association with the session ID. The first and second entities can communicate with each other using the session ID that has been established by the session module 410.

The first entity can have access to one or more objects that are stored by the computing environment 100. The one or more objects can include tables, functions, data entries, or any other data structure. The computing environment 100 can store a first set of privileges that the first entity has for processing or operating on one or more objects. The first set of privileges can also indicate privacy and security information that is needed to operate on the one or more objects. The first entity may identify the one or more objects to make available to the second entity to also process. The first entity can communicate the identity of the one or more objects, such as using object identifiers or address locations, to the object reference management module 420. In some examples, the first entity receives a communication, via the established session, from the second entity requesting access to the one or more objects. The first entity can communicate the identity to the object reference management module 420 in response to such a request.

Figure 5:
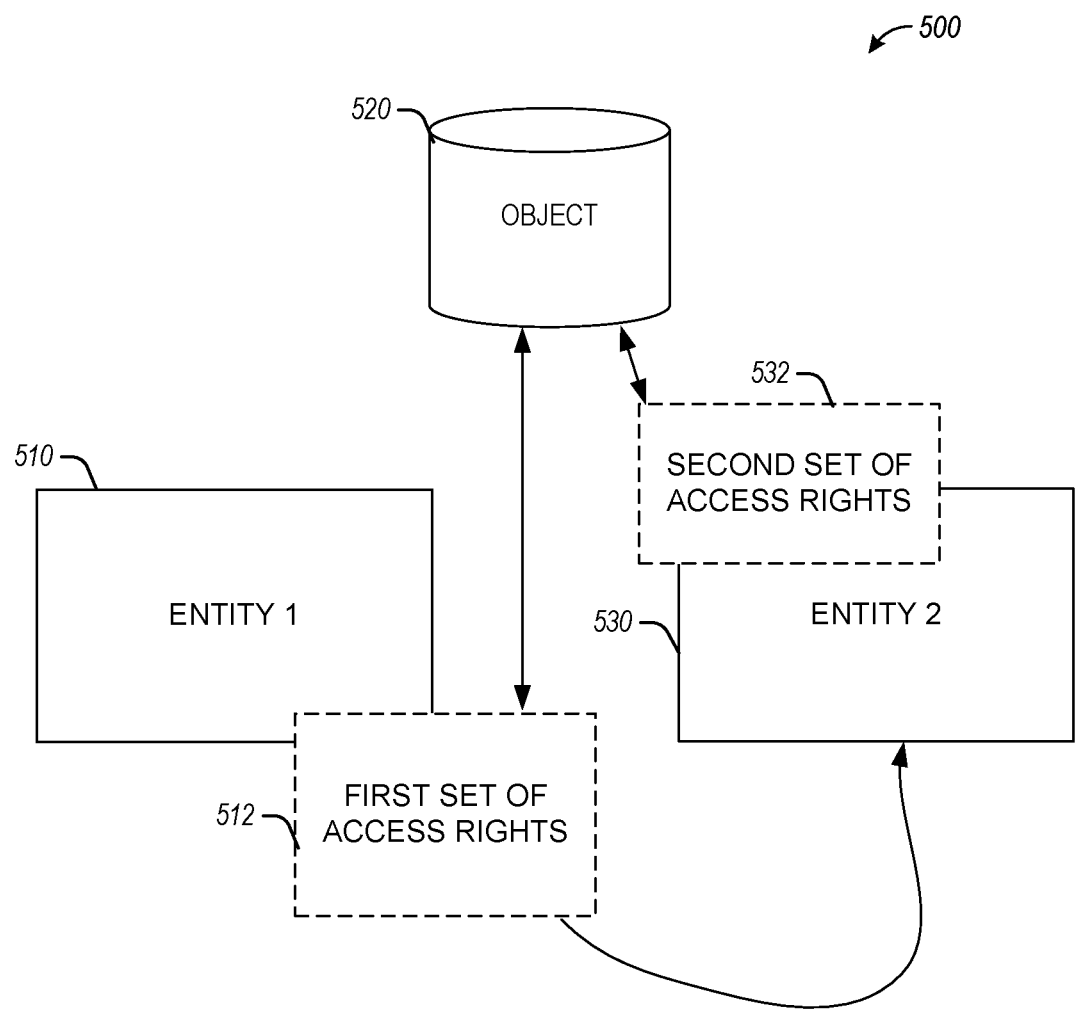
FIG. 5 is an illustrative operation of the access privileges system, in accordance with some embodiments of the present disclosure.

For example, as shown in the system 500 of FIG. 5, the first entity 510 can establish a communication session with the second entity 530. The first entity 510 can be associated with a first set of access rights 512 that can be used to access one or more objects 520 stored in the database of the computing environment 100. The first entity 510 can select a default set or a specified subset of the access rights 512 to share with the second entity 530. These access rights 512 (e.g., set of privileges) are shared as a second set of access rights 532 with the second entity 530. In response, the first entity 510 communicates the identity of the one or more objects 520 and the indication of the specified subset of the access rights 512 to the object reference management module 420.

Figure 6:
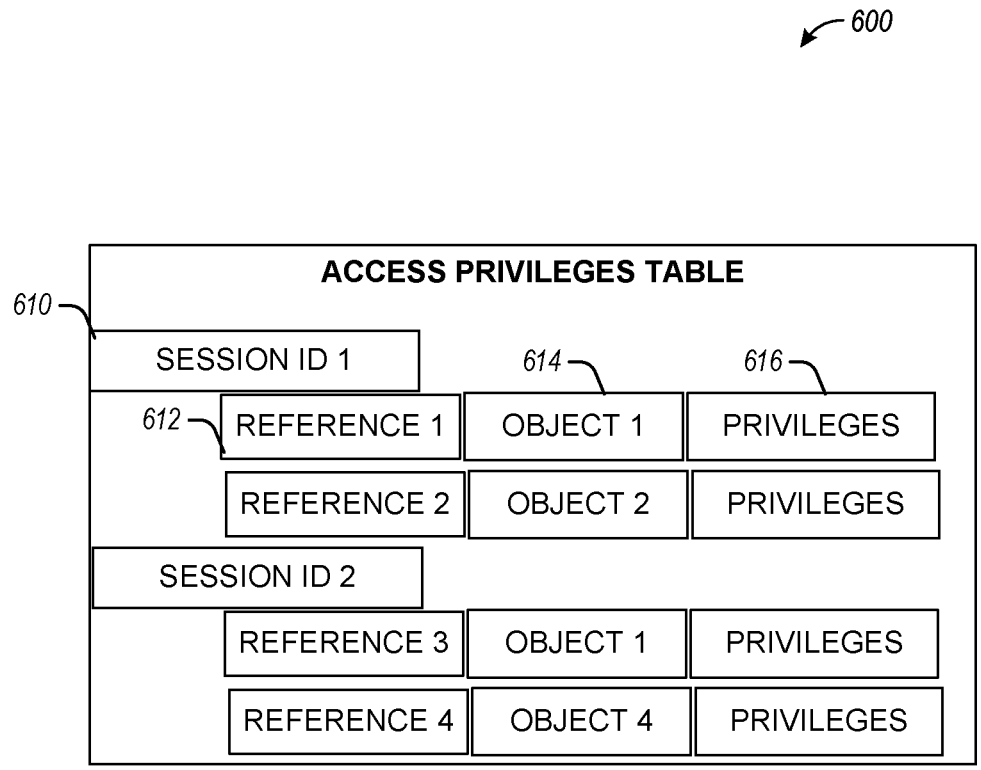
FIG. 6 is an illustrative access privileges table of the access privileges system, in accordance with some embodiments of the present disclosure.

The object reference management module 420, in response to receiving the identification of the one or more objects, generates a reference that is associated with the one or more objects. For example, the object reference management module 420 can generate a random sequence of textual characters (e.g., a random string) that is of a specified length. The object reference management module 420 can generate an access privileges table, such as the table 600 shown in FIG. 6. In some cases, the object reference management module 420 determines that the table 600 is already generated and adds one or more entries to the table 600 in response to receiving the identification of the one or more objects from the first entity 510.

As an example, the object reference management module 420 stores in a session identifier field 610 the session identifier that can be received from the session module 410 that identifies the session established between the first entity 510 and the second entity 530. In association with the session identifier field 610, the object reference management module 420 stores the reference in the reference field 612 (e.g., the random sequence of textual characters that have been generated) along with the storage location or identity of the one or more objects in the object field 614 and the specified subset of the access rights 512 (e.g., the second set of access rights 532) in the privileges field 616. In some examples, the specified subset of the access rights 512 (e.g., the second set of access rights 532) in the privileges field 616 correspond to a default set of access rights that are the exact same or a subset of less than all of the access rights or privileges of the first entity 530. For example, the first entity 530 can have read and write access rights to the one or more objects 520 and the specified subset of the access rights 512 include read only rights. In some cases, the object reference management module 420 determines that one or more access rights of the first entity 510 have changed (e.g., been reduced to read only rights). In such cases, the object reference management module 420 automatically updates the access rights stored in the privileges field 616 so that the second entity 530 is never provided more privileges or access rights than the first entity 510 relative to the one or more objects 520.

If the session identifier is already included in one of the session identifier fields 610, indicating that other references have previously been stored in the table 600, the object reference management module 420 appends another entry to the table 600 with the reference field 612 including the generated reference along with the storage location or identity of the one or more object fields 614 and the privileges field 616. In some cases, the object reference management module 420 also stores the condition for deleting or revoking the second set of access rights 532 provided to the second entity 530 in the table 600.

Referring back to FIG. 4, the object reference management module 420 communicates the reference to the second entity 530. The second entity 530 can call a variety of database functions and execute various SQL statements. In some cases, when the second entity needs to use the one or more objects 520 that are associated with the first entity 510, the second entity uses the reference received from the object reference management module 420. Specifically, the second entity can call a function that takes the reference as input parameters, fields, or arguments. In response to calling the function, the reference is transmitted to the first entity 510 along with data and other parameters and operations of the function.

The first entity 510 accesses the table 600 to retrieve a list of previously stored references corresponding to the session identifier of the first and second entities 510 and 530 matching one or more session identifiers in the session identifier field 610. The first entity 510 searches the entries or fields associated with the session identifier field 610, specifically the fields that store the reference field 612, to find a matching field corresponding to the reference received from the second entity in the function. In response to identifying a matching reference in the reference field 612 corresponding to the matching session identifier field 610, the first entity retrieves the address location or storage location or identifier of the one or more objects stored in the object field 614 that are mapped to the received reference stored in the reference field 612 along with the access privileges stored in the privileges field 616. In some cases, some of the operations for querying the table 600 to identify the one or more objects and access privileges can be performed by a third entity or host in addition to or as an alternative to the first entity 510.

In some cases, the first entity 510 accesses a stack of functions associated with the second entity representing previous function calls received from the second entity. The first entity 510 adds, to the top of the stack of functions, an identifier of the function received from the second entity. In this way, if a nested set of functions is called by the second entity 530, the first entity 510 can track when each function in the nested set of functions returns a result and can determine when the function at the top of the nested set of functions (e.g., the topmost function in a hierarchy) is being processed. The first entity 510 can then execute one or more operations associated with the function being called on the one or more objects corresponding to the object field 614 associated with the received reference. The first entity 510 can determine whether the operations being performed fall within the access rights 532 defined by the privileges field 616 prior to executing the operations. If the operations do not violate the access rights 532 defined by the privileges field 616, the first entity 510 executes the functions and returns the result to the second entity 530.

The first entity 510, in response to returning the result to the second entity 530, accesses the condition for revoking access to the one or more objects corresponding to the object field 614 associated with the received reference. For example, the condition can specify that the access is to be revoked in response to returning a result of a function call. In such cases, the first entity 510 automatically deletes the entries from the table 600 corresponding to the reference received from the second entity 530 that matches the reference field 612 in response to returning a result of the function call which included the reference. In some cases, instead of deleting the entries from the table 600, the first entity 510 automatically downgrades the access rights stored in the privileges field 616 that are associated with the reference received from the second entity 530 that matches the reference field 612 to the lowest possible access rights (e.g., no rights or read only rights).

In some cases, when nested function calls are being performed by the second entity 530, the first entity 510 uses the stack of functions to control when the access rights are revoked from the second entity 530. For example, the first entity 510, in response to returning a result of a function call, accesses the function stack to remove the function that is at the top of the stack from the stack. The first entity 510 can determine if additional functions remain in the function stack. If additional functions remain, the first entity 510 prevents automatically deleting the entries from the table 600 and/or revoking access to the one or more objects 520 from the second entity 530. If the first entity 510 determines that no more functions remain in the function stack, then the first entity 510 automatically deletes the entries from the table 600 associated with the reference received in the function call from the second entity 530 and/or revokes access to the one or more objects 520 from the second entity 530.

For example, the condition can specify that the access is to be revoked in response to terminating the session between the first entity 510 and the second entity 530. The condition can be user specified or selected automatically by the system. In such cases, the first entity 510 automatically deletes the entries from the table 600 corresponding to the reference received from the second entity 530 that matches the reference field 612 in response to receiving an indication from the session module 410 that the session has been terminated. In some cases, instead of deleting the entries from the table 600, the first entity 510 automatically downgrades the access rights stored in the privileges field 616 that are associated with the reference received from the second entity 530 that matches the reference field 612 to the lowest possible access rights (e.g., no rights or read only rights).

Figure 7:
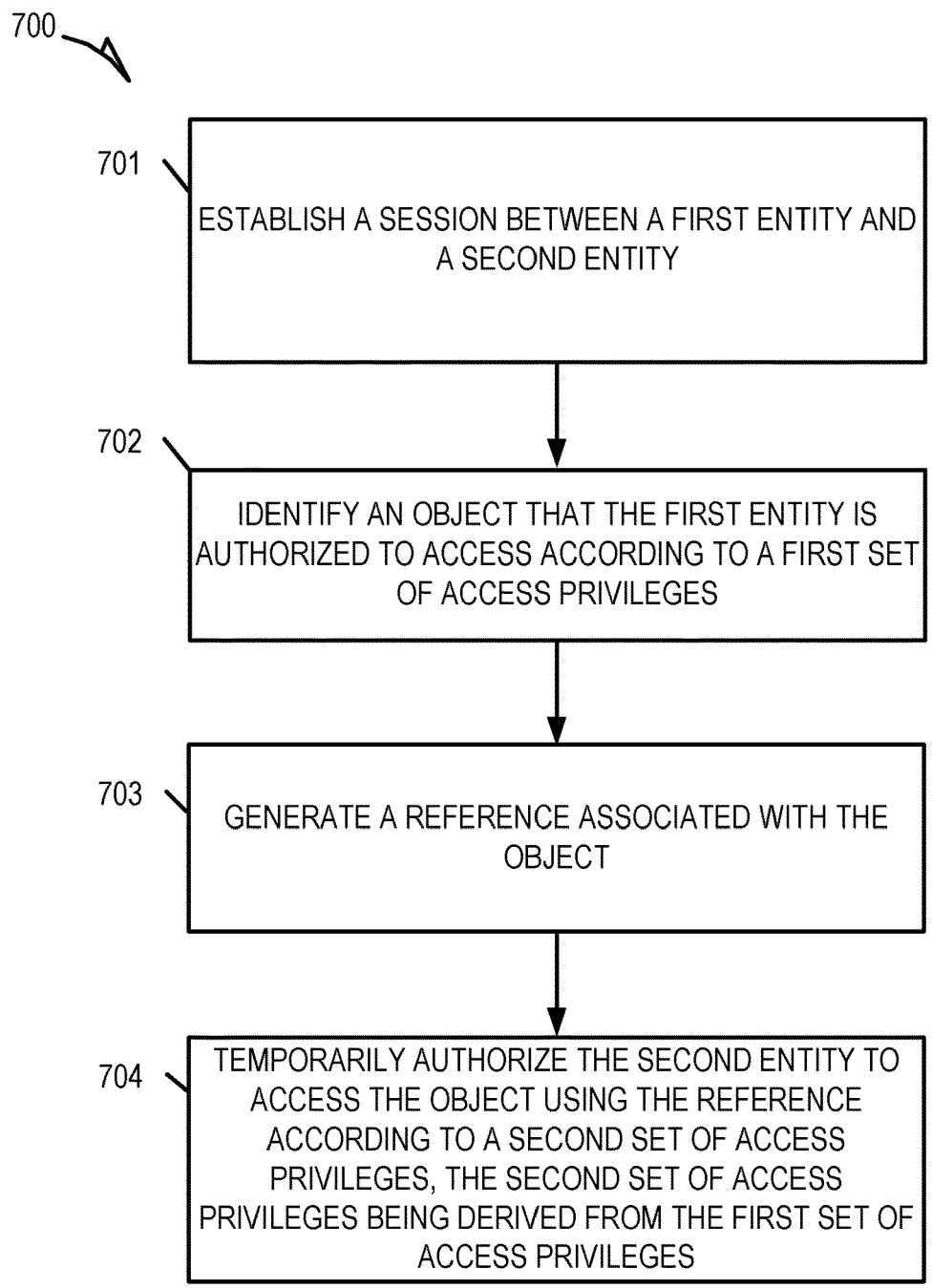
FIG. 7 is a flow diagram illustrating operations of the access privileges system, in accordance with some embodiments of the present disclosure.

FIG. 7 is a flow diagram illustrating operations 700 of the access privileges system 400, in accordance with some embodiments of the present disclosure. The operations 700 may be embodied in computer-readable instructions for execution by one or more hardware components (e.g., one or more processors) such that the operations of the operations 700 may be performed by components of data platform 102 such as the execution platform 110. Accordingly, the operations 700 is described below, by way of example with reference thereto. However, it shall be appreciated that operations 700 may be deployed on various other hardware configurations and is not intended to be limited to deployment within the data platform 102. Depending on the embodiment, an operation of the operations 700 may be repeated in different ways or involve intervening operations not shown. Though the operations of the operations 700 may be depicted and described in a certain order, the order in which the operations are performed may vary among embodiments, including performing certain operations in parallel or performing sets of operations in separate processes.

At operation 701, the access privileges system 400 establishes a session between a first entity and a second entity, as discussed above.

At operation 702, the access privileges system 400 identifies an object that the first entity is authorized to access according to a first set of access privileges, as discussed above.

At operation 703, the access privileges system 400 generates a reference associated with the object, as discussed above.

At operation 704, the access privileges system 400 temporarily authorizes the second entity to access the object using the reference according to a second set of access privileges, the second set of access privileges being derived from the first set of access privileges, as discussed above.

Described implementations of the subject matter can include one or more features, alone or in combination as illustrated below by way of example.

Example 1. A system comprising: at least one hardware processor; and at least one memory storing instructions that cause the at least one hardware processor to execute operations comprising: establishing a session between a first entity and a second entity; identifying an object that the first entity is authorized to access according to a first set of access privileges; generating a reference associated with the object; and temporarily authorizing the second entity to access the object using the reference according to a second set of access privileges, the second set of access privileges being derived from the first set of access privileges.

Example 2. The system of Example 1, wherein the session comprises a SQL session, and wherein the object comprises a table or function.

Example 3. The system of any one of Examples 1-2, wherein the first entity comprises a producer or caller process and the second entity comprises a consumer process.

Example 4. The system of any one of Examples 1-3, wherein the second set of access privileges is identical to the first set of access privileges.

Example 5. The system of any one of Examples 1-4, wherein the second set of access privileges is a subset of the first set of access privileges and includes at least one or more fewer access privileges than the first set of access privileges.

Example 6. The system of any one of Examples 1-5, wherein the first set of access privileges comprise select, insert, update, and truncate privileges, and wherein the second set of access privileges comprise only a select privilege.

Example 7. The system of any one of Examples 1-6, wherein the reference comprises a unique sequence of characters and excludes a direct link to the object.

Example 8. The system of Example 7, wherein the operations for generating the reference comprise: storing, in association with the session, a table that maps the unique sequence of characters of the reference to the object and the second set of access privileges.

Example 9. The system of Example 8, wherein the operations for temporarily authorizing the second entity to access the object using the reference comprise: deleting the table after the session is terminated.

Example 10. The system of any one of Examples 7-9, wherein the operations comprise: performing, by the second entity, a first function call that receives the reference as an argument; passing the reference via the first function call to the first entity; and searching the table using the reference to identify the object and the second set of access privileges.

Example 11. The system of Example 10, wherein the operations comprise: determining an operation associated with the first function; determining that the operation corresponds to the second set of access privileges; performing the operation on the object in response to determining that the operation corresponds to the second set of access privileges; and providing a result of the operation as an output of the function to the second entity.

Example 12. The system of Example 11, wherein the operations for temporarily authorizing the second entity to access the object using the reference comprise: deleting the reference from the table in response to providing the result of the operation as the output of the function to the second entity.

Example 13. The system of any one of Examples 11-12, wherein the operations for temporarily authorizing the second entity to access the object using the reference comprise: accessing a stack of functions comprising the first function and a second function in response to providing the result of the operation as the output of the function to the second entity; removing the first function from the stack in response to providing the result of the operation as the output of the function to the second entity; determining that the second function is at a top of the stack; and retaining the reference in the table in response to determining that the second function is at the top of the stack.

Example 14. The system of Example 13, wherein the operations for temporarily authorizing the second entity to access the object using the reference comprise: deleting the reference from the table in response to determining that the stack of functions is empty.

Example 15. The system of any one of Examples 1-14, wherein the operations comprise: detecting a change to the first set of access privileges; and updating the second set of access privileges in response to detecting the change to the first set of access privileges.

Example 16. The system of any one of Examples 1-15, wherein the operations comprise: preventing the second entity from accessing the object using the reference after the session is terminated or after one or more function calls performed by the second entity return respective one or more results.

Figure 8:
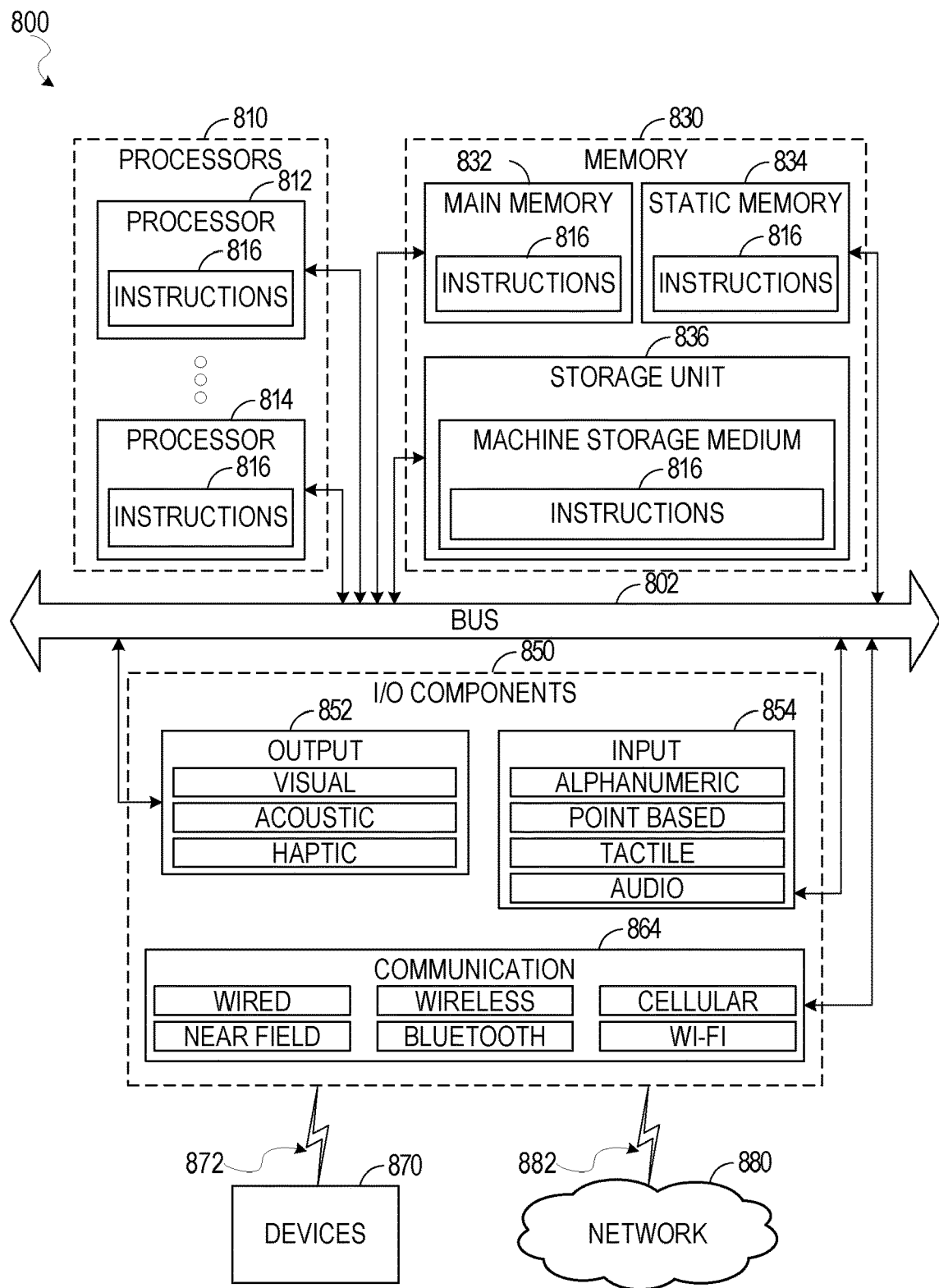
FIG. 8 illustrates a diagrammatic representation of a machine in the form of a computer system within which a set of instructions may be executed for causing the machine to perform any one or more of the methodologies discussed herein, in accordance with some embodiments of the present disclosure.

FIG. 8 illustrates a diagrammatic representation of a machine 800 in the form of a computer system within which a set of instructions may be executed for causing the machine 800 to perform any one or more of the methodologies discussed herein, according to an example embodiment. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute any one or more operations of the above processes (e.g., operations 700). In this way, the instructions 816 transform a general, non-programmed machine into a particular machine 800 (e.g., the compute service manager 108 or one or more execution nodes of the execution platform 110) that is specially configured to carry out any one of the described and illustrated functions in the manner described herein.

In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 includes processors 810, memory 830, and input/output (I/O) components 850 configured to communicate with each other such as via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors 810 that may comprise two or more independent processors (sometimes referred to as "cores") that may execute instructions 816 contemporaneously. Although FIG. 8 shows multiple processors 810, the machine 800 may include a single processor with a single core, a single processor with multiple cores (e.g., a multi-core processor), multiple processors with a single core, multiple processors with multiple cores, or any combination thereof.

The memory 830 may include a main memory 832, a static memory 834, and a storage unit 836, all accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 include components to receive input, provide output, produce output, transmit information, exchange information, capture measurements, and so on. The specific I/O components 850 that are included in a particular machine 800 will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, and other communication components to provide communication via other modalities. The devices 870 may be another machine or any of a wide variety of peripheral devices (e.g., a peripheral device coupled via a universal serial bus (USB)). For example, as noted above, the machine 800 may correspond to any one of the compute service manager 108, the execution platform 110, and the devices 870 may include any other computing device described herein as being in communication with the data platform 102.

The various memories (e.g., 830, 832, 834, and/or memory of the processor(s) 810 and/or the storage unit 836) may store one or more sets of instructions 816 and data structures (e.g., software) embodying or utilized by any one or more of the methodologies or functions described herein. These instructions 816, when executed by the processor(s) 810, cause various operations to implement the disclosed embodiments.

As used herein, the terms "machine-storage medium," "device-storage medium," and "computer-storage medium" mean the same thing and may be used interchangeably in this disclosure. The terms refer to a single or multiple transitory or non-transitory storage devices and/or media (e.g., a centralized or distributed database, and/or associated caches and servers) that store executable transitory or non-transitory instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 880 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., hypertext transfer protocol (HTTP)). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the process or operations 700 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A method comprising:
   establishing, by at least one hardware processor, a session between a first entity and a second entity;
   generating a session identifier that identifies the session between the first entity and the second entity, the first entity communicating with the second entity using the session identifier;
   identifying an object that the first entity is authorized to access according to a first set of access privileges;
   generating a reference associated with the object;
   accessing a table that includes a session identifier field, a reference field, and an object field;
   storing the session identifier of the first entity and the second entity in the session identifier field of the table, the reference in the reference field of the table, and a storage location of the object in the object field of the table; and
   temporarily authorizing, based on the table, the second entity to access the object using the reference according to a second set of access privileges, the second set of access privileges being derived from the first set of access privileges, the second entity being temporarily authorized in response to:
      receiving the session identifier and the reference from the second entity; and
      searching the table for a matching reference stored in the reference field corresponding to the received session identifier.

2. The method of claim 1, wherein the session comprises a structured query language (SQL) session; and
   wherein the object comprises an individual table or function.

3. A non-transitory computer-storage medium comprising instructions that, when executed by a processor of a machine, configure the machine to perform operations comprising:
   establishing a session between a first entity and a second entity;
   generating a session identifier that identifies the session between the first entity and the second entity, the first entity communicating with the second entity using the session identifier;
   identifying an object that the first entity is authorized to access according to a first set of access privileges;
   generating a reference associated with the object;
   accessing a table that includes a session identifier field, a reference field, and an object field;
   storing the session identifier of the first entity and the second entity in the session identifier field of the table, the reference in the reference field of the table, and a storage location of the object in the object field of the table; and
   temporarily authorizing, based on the table, the second entity to access the object using the reference according to a second set of access privileges, the second set of access privileges being derived from the first set of access privileges, the second entity being temporarily authorized in response to:
receiving the session identifier and the reference from the second entity; and
searching the table for a matching reference stored in the reference field corresponding to the received session identifier.

4. The non-transitory computer-storage medium of claim 3, wherein the session comprises a structured query language (SQL) session; and
wherein the object comprises an individual table or function.

5. The non-transitory computer-storage medium of claim 3, wherein the first entity comprises a producer or caller process and the second entity comprises a consumer process.

6. The non-transitory computer-storage medium of claim 3, wherein the second set of access privileges is identical to the first set of access privileges.

7. The non-transitory computer-storage medium of claim 3, wherein the second set of access privileges is a subset of the first set of access privileges and includes at least one or more fewer access privileges than the first set of access privileges.

8. The non-transitory computer-storage medium of claim 3, wherein the first set of access privileges comprise select, insert, update, and truncate privileges; and
wherein the second set of access privileges comprise only a select privilege.

9. The non-transitory computer-storage medium of claim 3, wherein the reference comprises a unique sequence of characters and excludes a direct link to the object.

10. A system comprising:
at least one hardware processor; and
at least one memory storing instructions that cause the at least one hardware processor to execute operations comprising:
establishing a session between a first entity and a second entity;
generating a session identifier that identifies the session between the first entity and the second entity, the first entity communicating with the second entity using the session identifier;
identifying an object that the first entity is authorized to access according to a first set of access privileges;
generating a reference associated with the object;
accessing a table that includes a session identifier field, a reference field, and an object field;
storing the session identifier of the first entity and the second entity in the session identifier field of the table, the reference in the reference field of the table, and a storage location of the object in the object field of the table; and
temporarily authorizing, based on the table, the second entity to access the object using the reference according to a second set of access privileges, the second set of access privileges being derived from the first set of access privileges, the second entity being temporarily authorized in response to:
receiving the session identifier and the reference from the second entity; and
searching the table for a matching reference stored in the reference field corresponding to the received session identifier.

11. The system of claim 10, wherein the session comprises a structured query language (SQL) session; and wherein the object comprises an individual table or function, the second entity being temporarily authorized to access the object using the reference without revealing a storage location and security associated with the object.

12. The system of claim 10, wherein the first entity comprises a producer or caller process and the second entity comprises a consumer process.

13. The system of claim 10, wherein the second set of access privileges is identical to the first set of access privileges.

14. The system of claim 10, wherein the second set of access privileges is a subset of the first set of access privileges and includes at least one or more fewer access privileges than the first set of access privileges.

15. The system of claim 10, wherein the first set of access privileges comprise select, insert, update, and truncate privileges; and wherein the second set of access privileges comprise only a select privilege.

16. The system of claim 10, wherein the reference comprises a unique sequence of characters and excludes a direct link to the object.

17. The system of claim 16, wherein the operations for generating the reference comprise:
storing, in association with the session, information in the table that maps the unique sequence of characters of the reference to the object and the second set of access privileges.

18. The system of claim 17, wherein the operations for temporarily authorizing the second entity to access the object using the reference comprise:
deleting the table after the session is terminated.

19. The system of claim 17, wherein the operations comprise:
performing, by the second entity, a first function call that receives the reference as an argument;
passing the reference via the first function call to the first entity; and
searching the table using the reference to identify the object and the second set of access privileges.

20. The system of claim 19, wherein the operations comprise:
determining an operation associated with the first function;
determining that the operation corresponds to the second set of access privileges;
performing the operation on the object in response to determining that the operation corresponds to the second set of access privileges; and
providing a result of the operation as an output of the function to the second entity.

21. The system of claim 20, wherein the operations for temporarily authorizing the second entity to access the object using the reference comprise:
deleting the reference from the table in response to providing the result of the operation as the output of the function to the second entity.

22. The system of claim 20, wherein the operations for temporarily authorizing the second entity to access the object using the reference comprise:
accessing a stack of functions comprising the first function and a second function in response to providing the result of the operation as the output of the function to the second entity;
removing the first function from the stack in response to providing the result of the operation as the output of the function to the second entity;
determining that the second function is at a top of the stack; and retaining the reference in the table in response to determining that the second function is at the top of the stack.

23. The system of claim 22, wherein the operations for temporarily authorizing the second entity to access the object using the reference comprise:
deleting the reference from the table in response to determining that the stack of functions is empty.

24. The system of claim 10, wherein the operations comprise:
detecting a change to the first set of access privileges; and
updating the second set of access privileges in response to detecting the change to the first set of access privileges.

25. The system of claim 10, wherein the operations comprise:
preventing the second entity from accessing the object using the reference after the session is terminated or after one or more function calls performed by the second entity return respective one or more results.

* * * * *

UNITED STATES PATENT AND TRADEMARK OFFICE
CERTIFICATE OF CORRECTION

PATENT NO. : 11,934,543 B1
APPLICATION NO. : 18/056489
DATED : March 19, 2024
INVENTOR(S) : Bi et al.

Page 1 of 1

It is certified that error appears in the above-identified patent and that said Letters Patent is hereby corrected as shown below:

In the Claims

In Column 25, Line 66, in Claim 11, after "and", insert a linebreak

In Column 26, Line 16, in Claim 15, after "and", insert a linebreak

Signed and Sealed this
Twenty-second Day of July, 2025

Coke Morgan Stewart
*Acting Director of the United States Patent and Trademark Office*